United States Patent [19]

Holler, Jr.

[11] 3,918,915
[45] Nov. 11, 1975

[54] POLLUTION ABATEMENT SYSTEM

[76] Inventor: George J. Holler, Jr., 210 S. Marietta St., St. Clairsville, Ohio 43950

[22] Filed: Jan. 8, 1973

[21] Appl. No.: 321,781

[52] U.S. Cl. ............... 23/262; 23/277 C; 55/388; 55/409; 55/474; 55/515
[51] Int. Cl.² ..... B01D 53/34; B01J 8/10; B01J 1/14
[58] Field of Search ......... 23/277 C, 284, 286, 262, 23/288 F; 55/388, DIG. 30, 474, 408, 390, 409, 99, 78, 515, 289

[56] References Cited
UNITED STATES PATENTS

| | | | |
|---|---|---|---|
| 1,051,017 | 1/1913 | Schmidt | 55/408 |
| 2,152,760 | 4/1939 | Gormley | 55/289 |
| 2,639,000 | 5/1953 | Edwards | 55/390 |
| 2,653,675 | 9/1953 | Lynch | 55/99 |
| 2,670,132 | 2/1954 | Podbielniak | 55/409 |
| 2,876,080 | 3/1959 | Ruth | 23/288 F UX |
| 2,878,107 | 3/1959 | Ruth | 23/288 F UX |
| 3,083,081 | 3/1963 | Sharp et al. | 23/286 |
| 3,295,930 | 1/1967 | Swanson et al. | 23/286 |
| 3,307,920 | 3/1967 | Barnes | 23/288 F |
| 3,683,625 | 8/1972 | McCrink | 23/277 C |
| 3,706,538 | 12/1972 | Chew | 23/284 |
| 3,717,978 | 2/1973 | Osborne | 55/289 |
| 3,751,227 | 8/1973 | Robinson | 23/286 |

FOREIGN PATENTS OR APPLICATIONS

| | | | |
|---|---|---|---|
| 1,146,213 | 11/1957 | France | 55/474 |

Primary Examiner—Barry S. Richman
Assistant Examiner—Bradley R. Garris
Attorney, Agent, or Firm—Brown, Murray, Flick & Peckham

[57] ABSTRACT

A pollution abatement system utilizing an afterburner and a downstream smoke-conditioning assembly including a chemical reaction filter device having a drum containing substantial quantities of loose furnace slag or limestone, the surface of which is continuously maintained reactive by the abrading action produced as the drum is continuously rotated. Furnace smoke discharged from the afterburner is injected with steam to provide sufficient quantities of water to chemically react the $SO_2$ component in the furnace smoke with the limestone. The material abraded from the limestone passes from the drum through a series of holes formed in the peripheral surface thereof which are maintained open by contact with a series of spaced spoked wheels.

11 Claims, 3 Drawing Figures

POLLUTION ABATEMENT SYSTEM

BACKGROUND OF THE INVENTION

Various smoke control systems have been developed in the past which were addressed to eliminating or reducing air pollution stemming from noxious and corrosive gases which usually include solid particulate matter. Some of these systems involve electrostatic precipitation techniques for the removal of particulate matter while others employ afterburners wherein the smoke is further burned in a chamber beyond a main firebox in an attempt to effect complete combustion of the smoke. Most of these systems, however, are expensive and not altogether effective particularly to meet the ever-increasing demands of the industry for highly efficient and inexpensive air pollution abatement systems.

Some pollution abatement systems use filters which usually present a problem of requiring frequent replacement and/or cleaning of the filter units. The filter replacement problem may be alleviated to a large extent by employing a system according to the features of my prior U.S. Pat. No. 3,615,248, issued Oct. 26, 1971 and entitled "Smoke Control System". This system comprises an afterburner wherein the smoke is agitated into a turbulent condition to effect complete combustion of any combustible material and thereafter the smoke passes through a filter formed from expanded blast furnace slag. From the filter, the gases pass through a blower and thence through a second slag filter back into the stack. The two filters are carried in a rotatable drum containing a large number of filters such that upon rotation of the drum, a clean filter will be rotated into alignment with the conduit conveying the gases while a dirty filter is rotated to a position where it may be automatically flushed with water or other solvent to clean it. Thereafter, upon further rotation of the drum, the cleaned filter is again rotated back into alignment with the conduit conveying the gases passing from the afterburner. In this manner, the filter cartridges need not be replaced while, at the same time, a clean supply of filters is available.

In certain applications, it has been found that the cleaning of separate filter elements is unacceptable for the application. Moreover, when large quantities of gases are to be treated, the changing of filters, although convenient and rapid, nonetheless disrupted the operation of the smoke control system. Moreover, as the filtering media in these elements approached a saturation point, the effectiveness of the filters diminishes rapidly.

SUMMARY OF THE INVENTION

It is an overall object of the present invention to provide an improved and almost totally effective pollution abatement system for eliminating both particulate matter and gases, particularly the $SO_2$ component from smoke, fumes and the like.

It is an object of the present invention to provide a pollution abatement system incorporating a smoke-conditioning apparatus constructed and arranged to continuously maintain a chemically-reactive surface on filtering media.

In accordance with the present invention, a pollution abatement system is provided comprising an afterburner wherein smoke is received to effect complete combustion of any combustible materials therein and thereafter the smoke passes through a conduit to a smoke-conditioning apparatus containing blast furnace slag or limestone. Prior to entering the conditioning apparatus, steam or atomized water is combined with the smoke to enhance the chemical reactions occurring within the conditioning apparatus. The steam or water may be, if desired, combined with ammonia, sodium carbonate, lime stone dust or other suitable source of alkaline and then this mixture combined with the smoke to enhance the chemical reactions in the conditioning apparatus. In one embodiment of the invention shown herein, this apparatus comprises a drum driven about a horizontal axis to continuously tumble slag within the drum for abrading the surface of the slag to maintain the surface reactive with sulfur dioxide or other noxious gases in the smoke. The outer peripheral surface of the drum is perforated with a series of holes through which abraded reacted dust from the slag or limestone passes from within the drum. These holes are maintained open by rotor pins in the form of spoked wheels supported on a shaft arranged in a spaced-parallel relation to the rotational axis of the drum. The drum is supported within a housing having exhaust means for discharging the purified air. A bin at the bottom of the housing collects the reacted dust as a result of the abrasion of limestone or furnace slag.

In its preferred form, two or more of these filtering apparatus are arranged in tandem with suitable smoke conduit control valves to direct the smoke in a series relation to these filtering apparatus or in an independent manner.

These features and objects of the present invention as well as others will be more apparent to those skilled in the art when the following description is read in light of the accompanying drawings, in which.

Figure 1:
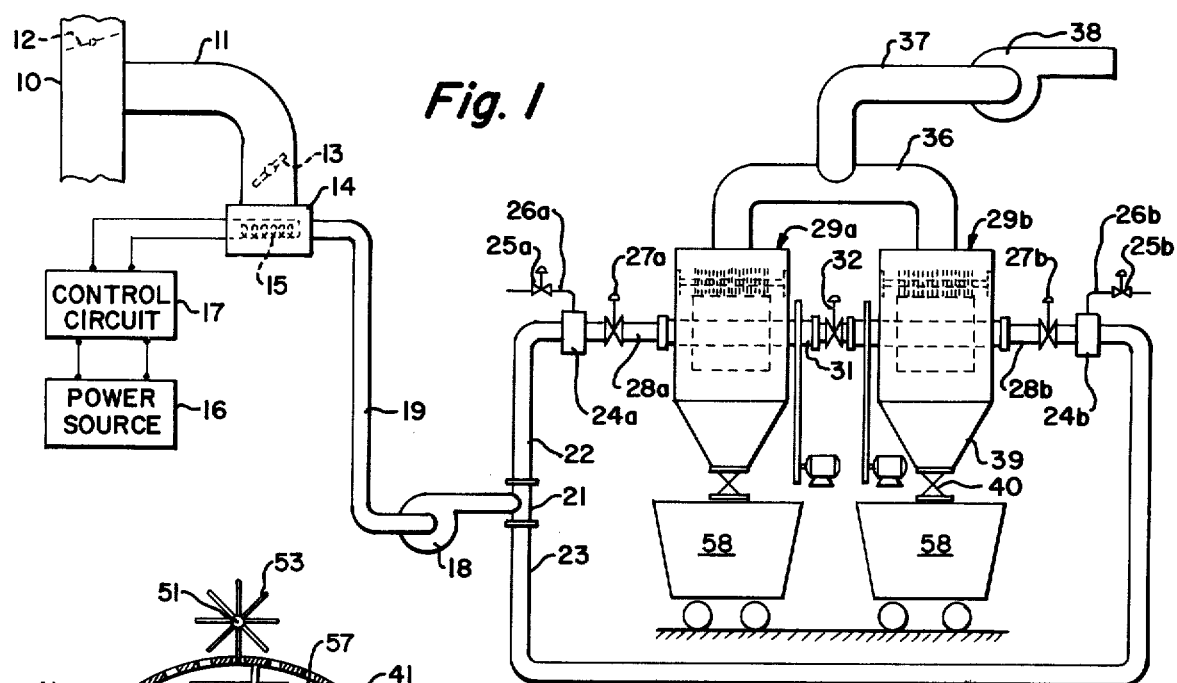
FIG. 1 is a schematic illustration of a pollution abatement system according to the present invention.

With reference now to the drawings, and particularly to FIG. 1, there is illustrated a smoke stack 10 through which smoke passes from a firebox, not shown, wherein the burning of coal, natural gas or other fuel takes place. Incident to the burning of these fuels, the smoke produced includes $SO_2$ in a gaseous state along with other air polluting components due to incomplete combustion of the fuel and solid particulate matter. The smoke discharged from the firebox is directed through a conduit pipe 11 by the closing of a valve 12 provided in the stack. Opening the valve 12 provides an emergency outlet for the smoke. A valve 13 in the conduit 11 controls entry of the smoke into an afterburner 14 which contains an electrical heating coil 15 connected to a suitable source of electrical power 16 by a control circuit 17. A pickup fan 18 draws smoke and gases from the afterburner through a conduit 19. The discharge port from the fan 18 is connected by a tee 21 to conduits 22 and 23. Each of these conduits has a steam injection chamber 24a and 24b, respectively, that have control valves 25a and 25b in steam delivery pipes 26a and 26b, respectively. Downstream of each steam injection chamber 24a and 24b, there is provided a shut-off control vavle 27a and 27b, in lines 28a and 28b, respectively, connected to smokeconditioning apparatus 29a and 29b, respectively. Conduit line 31 having a valve 32 controls the communication of gases and smoke between the apparatus 29a and 29b. If desired, ammonia, sodium carbonate, limestone dust, or other alkaline material may be combined with the steam and delivered by pipes 26a and 26b, to the chambers 24a and 24b.

Figure 2:
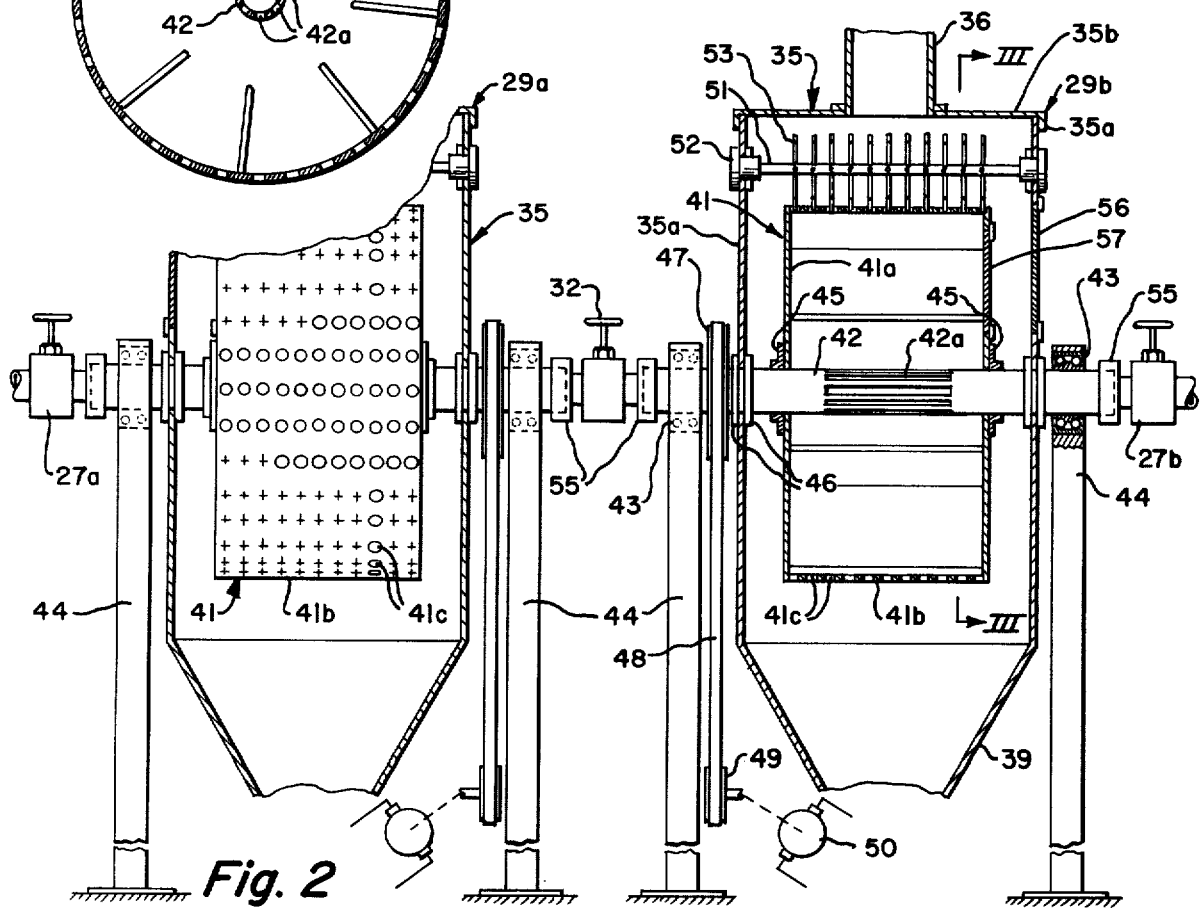
FIG. 2 is an enlarged elevational view, partly in section, of the smoke-conditioning apparatus illustrated in FIG. 1.

In view of the fact that each smoke-conditioning apparatus 29a and 29b is constructed in a similar manner, the following description will apply with equal effect to each of these apparatus. As clearly shown in FIGS. 1 and 2, each smoke-conditioning apparatus includes a housing 35 formed by upright side walls 35a and a top cover 35b. This cover has an opening into which there is received an exhaust manifold 36 through which purified air is withdrawn from the housing and transported through a conduit 37 by an exhaust fan 38. The walls 35a, at the bottom of the housing, taper inwardly to form a hopper 39 that is closed at its bottom end by a gate valve 40. A drum 41 is arranged within the space enclosed by the housing and supported for rotation about a horizontal axis by a tubular shaft 42 extending through opposed sides of the housing where bearings 43 support the shaft on pedestals 44. Flanges 45 secure the shaft 42 to the drum 41 and seals 46 at each side of the walls 35a form an airtight enclosure for the drum within the housing. A pulley 47 secured to the shaft 42 has a belt 48 extending in a downward direction to a motor pulley 49 driven by a motor 50 which is connected to a suitable control means, not shown. The drum 41 has axially-spaced end walls 41a connected to a rim 41b into which there is formed a series of axially-spaced and circumferentially-arranged holes 41c. An idler shaft 51, rotatably supported by bearings 52 in the walls 35a, carries spaced-apart spoked wheels 53 arranged to project within one of each series of holes 41c as the drum rotates.

Figure 3:
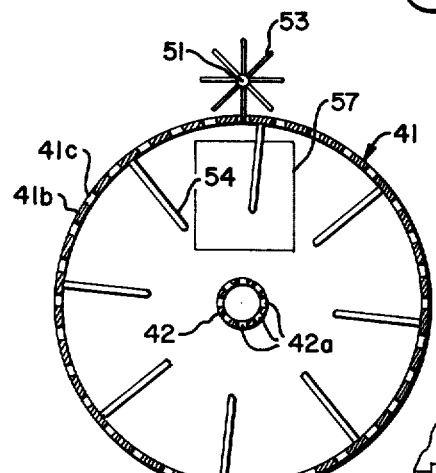
FIG. 3 is a sectional view taken along line III—III of FIG. 2.

As best shown in FIG. 3, the drum includes a series of radially-extending baffle plates 54 having a predetermined length to extend from the rim 41b a short distance toward the shaft 42. The pipes 28a, 28b and 31 are arranged coaxially within the tubular shaft 42 such that at the point of entry into the shaft, seals 55 form a rotatable airtight connection. Elongated slots 42a in the shaft 42, provide a passage for gases from the conduit 22 or 23 to the interior of the drum 41. Scrap buckets 58 are positioned below the gate valve 40 and movably supported by wheels to a remote dumping station, not shown.

In the operation of the pollution abatement system as described above, the valve 12 is positioned so as to direct smoke and gases discharged from the flue 10 to the afterburner 14 where the heating coils effect the burning of any combustible materials in the smoke. The gases and particulate matter delivered from the afterburner are conveyed through the conduits 19 to the pipes 22 and 23 where the control valves 27a and 27b are used to deliver a controlled volume of steam for combining with the gases contained in the pipes. Should it be desired to operate the smoke-conditioning apparatus 29a and 29b in a separate and independent manner, then the valves 27a and 27b are opened and the valve 32 is closed. Under these conditions, steam is injected in a controlled manner into both chambers 24a and 24b. In the alternative mode of operation, the smoke-conditioning apparatus 29a and 29b are operated in tandem in which event the valve 32 is opened and either the valve 27a or 27b will be closed and, depending upon which valve is closed, the associated steam injection chamber 24a or 24b will be rendered inoperative. In this manner, the gases entering one of the smoke-conditioning apparatus may pass freely to the other conditioning apparatus.

The drum 41 is rotated slowly to produce a continuous motion between a charge of limestone or slag which is introduced into the drum through a removable cover 56 in the housing 35 and a cover 57 in the side wall of the drum. It is preferred to fill the volume of the drum approximately 80–95% of its capacity. As the wetted gases and smoke enter the drum, the particulate matter is filtered out due to the filtering action of the charge of limestone or slag and, at the same time, the $SO_2$ component of the gases undergoes a chemical reaction with the calcium carbonate component of the limestone. The reactive surface of the limestone is continually renewed by the abrading action produced as the slag is tumbled within the drum during rotation by the drive motor 50.

To eliminate $SO_2$, it has been found that it must react with something since it is a gas. In order to react $SO_2$ with a base, reaction must be carried out in the presence of water ($H_2O$). Therefore, to completely eliminate $SO_2$, a so-called wet system is provided by the use of the steam injection chambers, although smoke usually contains some quantity of steam. Tests which have been conducted, according to the teachings of this invention, have demonstrated that in order for the system to function in a highly desirable manner, the material abraded from the limestone should be in a form of a wetted dust or powder so that it can be easily discharged through the openings in the drum from where it passes along with the fly-ash and other material filtered out of the gas into the hopper 39 from where it is periodically dumped into the scrap buckets 58.

In regard to the aforesaid tests, a 16-inch diameter drum was employed with holes in its rim of 3/16-inch diameter. The drum was rotated at a speed of 20 to 24 revolutions per minute. Furnace slag ranging in size between ¼ to ½ inch was loaded into the drum between 90–95% of its capacity. A gaseous input to the filtering assembly at a rate of 57.7 cubic feet per minute had a chemical analysis of greater than 150 parts per million of $SO_2$. During a first test, the filter was not in motion and the gas input was not subject to a wetting action by the steam chambers. The output rate from the filter was determined to be at a rate of 239 cubic feet per minute and an analysis of this exhaust established that the $SO_2$ component was 8 parts per million or a 78% reduction to the input of 150 parts per million. In a second test, the filter was set into motion at 20 to 24 revolutions per minute and a small quantity of steam was injected into the gaseous input. The output from the filter was at the rate of 225 cubic feet per minute. A chemical analysis of this exhaust revealed that the $SO_2$ component was less than 0.5 part per million. During this test, the input of the $SO_2$ component was also measured at 150 parts per million. The actual chemical reaction occurring within the drum is thought to take place by the combination of the $SO_2$ gas with steam to produce $H_2SO_3$ which is then further oxidized to a gaseous $H_2SO_4$. This product combines with calcium carbonate in the limestone to form $CaSO_4$ and carbonic acid, the former being a salt and the latter being an unstable acid which immediately decomposes into water and carbon dioxide. In place of the steam injection chambers, water may be added directly within the drum 41 in the form of an atomized or fine spray. Irrespective of the manner of adding water to the filter system, the water content should be such so as to keep the filter media (limestone or slag) damp but not adding such quantities of water to cause a slurry of the dust-laden particles.

Although the invention has been shown in connection with one embodiment of the present invention, it will be readily apparent to those skilled in the art that the various changes in form and arrangement of parts may be made to suit requirements without departing from the spirit and scope of the invention.

I claim as my invention:

1. In a pollution abatement system for purifying waste gas containing $SO_2$, the combination of an afterburner, means for directing waste gas into said afterburner, heating means within said afterburner for burning combustible materials in said waste gas, and waste gas conditioning means comprising a drum containing a bed of loose granular media which is chemically-reactive with at least the sulfur dioxide component in the waste gas, said drum including a rim section into which there is formed perforations for discharge from the drum of reacted material abraded from said media and purified waste gas, conduit means for conducting waste gas from said afterburner into said drum, means for continuously rotating said drum to abrade the surface of said media and maintain a chemically-reactive surface thereon, a housing for enclosing said drum, said housing having a chamber for receiving reacted material abraded from said media, closure means for said chamber, and exhaust means communicating with said housing for discharging purified waste gas passing from said drum.

2. A pollution abatement system according to claim 1 further comprising a plurality of said waste gas conditioning means, and a conduit line having a control valve for selectively directing waste gas between each of said waste gas conditioning means.

3. A pollution abatement system according to claim 1 wherein said chemically-reactive media includes loose limestone slag of quantities sufficient to occupy at least 80% of the volume within said drum.

4. A pollution abatement system according to claim 1 further comprising a steam injection chamber communicating with said conduit means, and means for controlling the delivery of steam into said injection chamber.

5. A pollution abatement system for purifying waste gas containing $SO_2$ comprising: a drum supported for rotation about a horizontal axis, said drum including axially-spaced end walls interconnected by a perforated rim section having openings therein constructed and arranged for the essentially continuous discharge of abraded, reacted material from the drum, one of said end walls having a central inlet opening for the passage of waste gas into the drum, said drum defining an essentially open contiguous material exchange chamber, a housing enclosing the drum and spaced from said perforated rim section, the housing having an outlet communicating with a space in the housing which encircles said perforated rim section for the exhaust of purified waste gas, conduit means for conducting waste gas containing sulfur dioxide through an opening in a wall of said housing and thence through said inlet opening into the exchange chamber of the drum, a bed of loose limestone slag filling most of the exchange chamber of the drum for removing sulfur dioxide from the waste gas passing through the drum to said outlet, means for rotating the drum continuously to tumble the limestone slag within the open and contiguous material exchange chamber thereof to abrade the surface of the limestone slag and thereby maintain said limestone slag reactive with the sulfur dioxide component of the waste gas, and means spaced below the drum in constant communication with the space encircling the perforated rim section thereof for collecting abraded, reacted material falling from the drum and which is abraded from the surface of the limestone slag therein.

6. A pollution abatement system according to claim 5 including a hollow shaft extending through said inlet opening and through the end wall of the drum, means rigidly connecting the shaft to the drum, and means rotatably connecting the shaft to the housing, the shaft being provided inside the drum with openings and forming part of said conduit means, said drum rotating means including means connected with said shaft outside the housing for rotating the shaft.

7. A pollution abatement system according to claim 5 further comprising baffle plate means within said drum and extending radially from said rim section toward said horizontal axis.

8. A pollution abatement system according to claim 5 further comprising a hopper at the bottom of said housing forming a chamber for receiving material abraded from the limestone slag, said chamber having an outlet in the bottom thereof, and closure means normally closing the chamber outlet.

9. A pollution abatement system according to claim 8 further comprising a shaft, located within said housing but external to said drum supported by said housing for rotation about an axis parallel to and spaced from said horizontal axis, said shaft carrying means for projecting into the perforations in said rim section to maintain said perforations open for the passage of reacted material from the drum into said chamber.

10. A pollution abatement system according to claim 5 further comprising water supply means associated with said conduit means for combining controlled quantities of water with the waste gas to enhance a chemical reaction between sulfur dioxide and said limestone slag.

11. A pollution abatement system according to claim 10 wherein said water supply means comprises a steam-waste gas mixing chamber in said conduit means, and steam delivery pipes including valves and control means connected to said valves.

* * * * *